United States Patent
Hattori et al.

(10) Patent No.: US 7,604,679 B2
(45) Date of Patent: Oct. 20, 2009

(54) FINE NICKEL POWDER AND PROCESS FOR PRODUCING THE SAME

(75) Inventors: Yasumasa Hattori, Niihama (JP); Egon Matijevic, Potsdam, NY (US)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 421 days.

(21) Appl. No.: 11/266,495

(22) Filed: Nov. 4, 2005

(65) Prior Publication Data

US 2007/0101822 A1    May 10, 2007

(51) Int. Cl.
| | |
|---|---|
| B22F 1/00 | (2006.01) |
| B22F 9/00 | (2006.01) |
| C21B 15/04 | (2006.01) |
| C22B 5/20 | (2006.01) |
| C22C 1/04 | (2006.01) |
| B22F 1/02 | (2006.01) |
| C22C 1/05 | (2006.01) |

(52) U.S. Cl. ............................ 75/369; 75/255; 75/343; 75/363; 75/374

(58) Field of Classification Search .................. 75/255, 75/343, 363, 369, 374
See application file for complete search history.

(56) References Cited

U.S. PATENT DOCUMENTS 5,460,641 A * 10/1995 Aslund et al. .................. 75/255
5,584,908 A * 12/1996 Scheie .......................... 75/374
6,632,265 B1 * 10/2003 Mukuno et al. ............... 75/739

FOREIGN PATENT DOCUMENTS

| JP | 11-152505 | 6/1999 |
|---|---|---|
| JP | 2004-84055 | 3/2004 |

OTHER PUBLICATIONS

Chen et al., A new and facile route to ultrafine nanowires, superthin flakes and uniform nanodisks of nickel hydroxide, Mar. 2, 2005, Chemical Physics Letters, 405, 159-164.*
Sun, Yugang, et al.; "Transformation of Silver Nanospheres into Nanobelts and Triangular Nanoplates through a Thermal Process;" *Nano Letters*; vol. 3, No. 5, pp. 675-679 (2003).
Ishikawa, Tatsuo, et al.; "Formation of Monodispersed Pure and Coasted Spindle-Type Iron Particles;" *Langmuir*; vol. 4, No. 1, pp. 26-31 (1988).

* cited by examiner

*Primary Examiner*—Roy King
*Assistant Examiner*—Caitlin Fogarty
(74) *Attorney, Agent, or Firm*—Edwards Angell Palmer & Dodge LLP (57) ABSTRACT

An efficient process for producing fine nickel powder, capable of metallizing the powder at low temperature to prevent its sintering, and fine nickel powder produced by the process, composed of particles having a flat shape, diameter of limited variations and uniform thickness, and suitable for internal electrodes for laminate ceramic capacitors of high electric capacity. The process comprises a step for forming a nickel compound coated with gelatin by adsorbing gelatin on preformed nickel compound particles with different size and shape (Step (A)), and another step for converting said nickel compound coated with gelatin into fine particles containing metallic nickel and nickel oxide by heating the nickel compound coated with gelatin produced in Step (A) in an inert gas atmosphere (Step (B)). It may include an additional step (Step (C)), subsequent to Step (B), for completely reducing nickel oxide in said fine particles by heating at temperature lower than that for Step (B) in a reducing gas atmosphere.

15 Claims, 5 Drawing Sheets

FINE NICKEL POWDER AND PROCESS FOR PRODUCING THE SAME

BACKGROUND OF THE INVENTION

1. Field of the Invention

The present invention relates to fine nickel powder and a process for producing it, more specifically an efficient process for producing fine nickel powder, capable of metallizing a nickel compound particles at low temperature to prevent its sintering, and fine nickel powder produced by the process, having a flat shape, a narrow size distribution and uniform thickness, and suitable for various applications such as internal electrodes for laminate ceramic capacitors of high electric capacity.

2. Description of the Prior Art

Fine nickel powders have been traditionally used as electro conductive pastes material for electrical circuit devices, such as electrodes for laminate ceramic parts, e.g., laminate ceramic capacitors and multilayered ceramic substrates, in which the material is used as an electroconductive material for thick films. Recently, the used laminate ceramic capacitors as electric component has grown. A laminate ceramic capacitor is composed of ceramic dielectrics and internal metallic electrodes, alternately stacked in layers, fast pressed to each other, and sintered to form a monolithic structure. For production of internal electrodes, a mixture of nickel powder and an organic vehicle, with an organic binder (e.g., cellulosic resin) dissolved in a solvent, is kneaded by a 3-roll mill or the like. Then, the resulting electroconductive paste is placed on a green sheet of ceramic dielectric (e.g., barium titanate) by printing, and the laminate is cut to a given size and sintered in a neutral or reducing atmosphere to produce the internal electrodes.

With the progress of miniaturization of electronic components, demand of ultrafine metal particles is growing. In the market of multilayered ceramic capacitors, one of the largest electronic components demand is thinning of metal electrode layers. Discontinuity of metal electrode layers occurs when the layer becomes thinner because of the decrease in the number of stacking particles. If the size of particles becomes smaller, the stacking number will increase. However, coagulation of particles in paste will be the problem with decreasing particle size, resulting in discontinuity of metal electrode layer. Furthermore, when the metal particle size decreases to below 0.1 µm (100 nm), handling of these products becomes difficult. Moreover, the temperature at which these particles are sintered will sharply decrease to cause problems, e.g. breaking of films of these particles.

Because of the problem mentioned above, a new approach producing a new material is required. Obviously, in this regard, we are approaching the limit of thickness of metal electrode.

However, by controlling the shape of metal particles, it may be possible to reach nanometer in the thickness and sub-micrometer in longitudinal direction, leading to achieving the desired properties for MLCC. For example, it should be possible to produce a dramatic increase in stacking number by the use of nanometer metal flake with keeping easy handling performance by using shape-controlled particles, such as Ni flakes. Thus, with the platelet-like particle of 0.2~0.3 µm in diameter and 20~30 nm in thickness, it should be possible to produce high performance of metal electrode layers because the stacking number are tenfold.

Both physical and chemical processes for producing fine powder of metallic nickel have been reported. One of the physical processes is based on deformation of metals by attrition. For example, JP-A 2004-84055 (Pages 1 and 2) discloses that attrition of nickel particles gives flaked particles having an average thickness of 0.03 to 0.5 µm. However, particles varying so much in diameter cannot give internally very thin electrodes in a reproducible manner. Obviously, this process cannot yield metallic particles of properties that are required in applications described above.

The chemical processes are essentially based on reduction of the metal ions in solution. By growing certain faces of metal crystals to produce fine particles with desired shapes, substance is adsorbed on a crystal plane to retard crystal growth of certain plane and by yielding particles of anisotropic shape. For example, Nano Letters, vol. 13, no. 5, 2003, p. 675-679 discloses the synthesis of triangular plate shape silver particles in an aqueous solution by using the described method. Although this process is giving the triangular plates having a diameter of around 100 nm, it is not practical due to low silver concentration.

Another chemical process is based on hydrogen-aided reduction of a metal hydroxide, oxide or, the like, because the latter can be more directly obtained in a different morphological shape than pure metal. For example, Langmuir, vol. 4, 1988, p. 26-31 discloses a technique by which iron oxide particles coated with silica was reduced to pure iron, thus preventing sintering of the particles during the reduction process. However, in this case, silica coating prevents production of conducting metal paste. Therefore, it is not suitable for the production of metallic nickel powder for laminate ceramic capacitors.

In another chemical process, it is proposed to synthesize nickel particles of flat shape (refer to, e.g., JP-A 11-152505 (Pages 1 and 2)) by reducing a mixture of at least one species of alkali-earth metal salt selected from the group consisting of the oxides, carbonates or hydroxides and nickel hydroxide with hydrogen at 800 to 1300° C. and then by dissolving alkali-earth metal salt in an acid. In this process the alkali-earth metal salt works as a barrier to diffusion of the metallic nickel particles and thereby prevents their growth. However, it is very difficult to completely prevent particle sintering because of inhomogeneous coating of the salt and high reduction temperature of 800° C. or higher, resulting in a product of flat shape, but in a variety of thicknesses from 0.05 to 0.9 µm.

In summary, it has been impractical to produce two-dimensional plate-shape Ni particles to mass produce for various applications such as internal electrodes for laminate ceramic capacitors.

SUMMARY OF THE INVENTION

It is an object of the present invention to provide an efficient process for producing fine nickel powder by reducing Ni compounds having controlled shapes at low temperature without their sintering. It is another object to provide fine nickel powder produced by the above process, composed of particles having a flat shape with diameter of limited variations and uniform thickness, being suitable for various applications such as internal electrodes for laminate ceramic capacitors of high electric capacity.

The inventors of the present invention have found, after having extensively studied processes for producing fine nickel powder, in particular suitable for internal electrodes for laminate ceramic capacitors, to achieve the above objectives. In the described process nickel compound coated with gelatin thereon can be converted into fine particles containing metallic nickel and nickel oxide in an inert gas. This intermediate fine particles containing metallic nickel and nickel oxide can then be rapidly converted to pure nickel particles by reduction with a reducing gas containing hydrogen at low temperature without causing sintering and by preserving the original shape. This procedure can give fine nickel particles having a flat shape, diameter of limited variations and uniform thickness, and suitable for various application such as internal electrodes for laminate ceramic capacitors of high electric capacity.

The first aspect of the present invention is a process for producing fine nickel powder, comprising a step for forming a nickel compound coated with gelatin by adsorbing gelatin on preformed nickel compound particles with different size and shape (Step (A)), and another step for converting said nickel compound coated with gelatin into fine particles containing metallic nickel and nickel oxide by heating the nickel compound coated with gelatin produced in Step (A) in an inert gas atmosphere (Step (B)).

The second aspect of the present invention is the first aspect for producing fine nickel powder, wherein Step (B) is followed by an additional step (Step (C)) for completely reducing nickel oxide in said fine particles by heating at temperature lower than that for Step (B) in a reducing gas atmosphere.

The third aspect of the present invention is the first or second aspect for producing fine nickel powder, wherein a shape of said preformed nickel compound particles is preserved after converting in Step (B) or reducing in Step (C).

The forth aspect of the present invention is the first or second or third aspect for producing fine nickel powder, wherein said preformed nickel compound particles are nickel hydroxide particles.

The fifth aspect of the present invention is the forth aspect for producing fine nickel powder, wherein said nickel hydroxide particles is produced by the reaction by mixing an aqueous nickel salt solution with an aqueous alkali solution.

The sixth aspect of the present invention is the fifth aspect for producing fine nickel powder, wherein an agitated aqueous suspension of said nickel hydroxide particles is aged at room temperature.

The seventh aspect of the present invention is the fifth aspect for producing fine nickel powder, wherein an agitated aqueous suspension of said nickel hydroxide particles is aged under heating.

The eighth aspect of the present invention is the fifth aspect for producing fine nickel powder, wherein said reaction is carried out at pH of the reactant solution kept lower than the isoelectric point of the nickel hydroxide.

The 9$^{th}$ aspect of the present invention is the fifth aspect for producing fine nickel powder, wherein said reaction is carried out in the presence of preformed seeds of nickel hydroxide particles.

The 10$^{th}$ aspect of the present invention is the 9$^{th}$ aspect for producing fine nickel powder, wherein said seeds are prepared by mixing nickel salt aqueous solution at a concentration of 0.1 mol/L or less with aqueous alkali solution to synthesize finely dispersed and uniform nickel hydroxide.

The 11$^{th}$ aspect of the present invention is the first or second or third aspect for producing fine powder, wherein said preformed nickel compound particles are plate-shaped particles.

The 12$^{th}$ aspect of the present invention is the first or second or third aspect for producing fine powder, wherein a quantity of gelatin of said nickel compound coated with gelatin is at 1.7% by mass or more relative to the total weight of the nickel compound and gelatin.

The 13$^{th}$ aspect of the present invention is the first or second or third aspect for producing fine nickel powder, wherein Step (A) is carried out by dispersing said preformed nickel compound particles in an aqueous solution of gelatin.

The 14$^{th}$ aspect of the present invention is the first or second or third aspect for producing fine nickel powder, wherein Step (B) is carried out by heating at temperatures between 300 and 500° C.

The 15$^{th}$ aspect of the present invention is the second or third aspect for producing fine nickel powder, wherein Step (C) is carried by heating at temperatures between 150 and 240° C.

The 16$^{th}$ aspect of the present invention is fine nickel powder produced by the process of the first or second aspects.

The 17$^{th}$ aspect of the present invention is the fine nickel powder of the 16$^{th}$ aspect which is composed of particles having a flat shape, diameter of limited variations and uniform thickness.

The 18$^{th}$ aspect of the present invention is the fine nickel powder of the 16$^{th}$ aspect which is composed of a plate-shaped metallic nickel powder each having the largest projected diameter of 30 to 300 nm and thickness of 50 nm or less.

The process of the present invention can efficiently produce fine nickel powder, because it can metallize the nickel compound without needing a reducing gas, e.g., hydrogen, and at low temperature by treating the powder to adsorb gelatin thereon and prevent sintering of the particles with each other, in accordance with teaching of the first aspect, and hence is of very high industrial value.

The process of the present invention, in which nickel compound particles are reduced with hydrogen, can reduce the powder at drastically lower temperature, and at increased reduction rate to prevent sintering during the reduction step, and hence is suitable for producing fine nickel powder for internal electrodes for laminate ceramic capacitors of high electric capacity, in accordance with teaching of the second aspect.

The process of the present invention can retain the same shape as preformed nickel compound particles, because a shape of said preformed nickel compound particles is preserved after converting in Step (B) or reducing in Step (C), in accordance with teaching of the third aspect.

Moreover, the process of the present invention can produce fine nickel powder more efficiently, in accordance with teaching of each of the forth to 10$^{th}$ and 12$^{th}$ to 15$^{th}$ aspects. It also can produce fine nickel powder composed of plate-shaped particles by retaining the same shape of the plate-shaped particles of the nickel compound, used as the precursor for the reduction, being suitable for producing fine nickel powder for internal electrodes for laminate ceramic capacitors of high electric capacity, in accordance with teaching of the 11$^{th}$ aspect.

The fine nickel powder of the present invention can be efficiently produced by the process of the present invention, in accordance with teaching of the 16$^{th}$ aspect. Moreover, it is composed of particles having a flat shape with diameter of limited variations and uniform thickness, and is suitable for internal electrodes for laminate ceramic capacitors of high electric capacity, in accordance with teaching of the 17$^{th}$ aspect.

Still more, the fine nickel powder of the present invention is composed of plate-shape fine nickel powder each having the largest projected diameter of 30 to 300 nm and thickness of 50 nm or less, and is suitable for internal electrodes for laminate ceramic capacitors of high electric capacity, in accordance with teaching of the 18th aspect.

DETAILED DESCRIPTION OF THE INVENTION

The process of the present invention for producing fine nickel powder, comprising a step for forming a nickel compound coated with gelatin by adsorbing gelatin on preformed nickel compound particles with different size and shape (Step (A)), and another step for converting said nickel compound coated with gelatin into fine particles containing metallic nickel and nickel oxide by heating at low temperature the nickel compound coated with gelatin produced in Step (A) in an inert gas atmosphere (Step (B)). The process may include an additional step (Step (C)), subsequent to Step (B), for reducing into fine particles of metallic nickel by treating the fine particles containing metallic nickel under and nickel oxide heating at temperature lower than that for Step (B) in a reducing gas atmosphere.

It is essential for the present invention to treat nickel compound particles coated with gelatin thereon under heating in an inert gas atmosphere. This heat treatment converts the preformed nickel compound particles into the fine particles containing metallic nickel and nickel oxide. It can also lower the temperature for the hydrogen-aided reduction step, when it is applied subsequently, to prevent sintering of the particles in this step. The process of the present invention can produce the fine nickel powder composed of particles having a flat shape, diameter of limited variations and uniform thickness, when flat shape nickel compound particles are treated.

In the process of the present invention, metallization of the nickel compound particles is achieved by the aid of gelatin chemically adsorbed on the particles, which thermally decomposes the particles on which it is adsorbed to separate out metallic nickel. This reaction produces the flat particles containing metallic nickel, when the initial nickel compound particles are flat.

When thermal decomposition alone cannot completely reduce the nickel compound to metallic nickel, a reducing step with a gas containing a reducing gas, e.g., hydrogen, may be added, as required to fully carry out the reduction. Sintering of the particles with each other is prevented during the reduction step by first thermally decomposing the particles in an inert gas, e.g., nitrogen gas, and then reducing them with a gas containing a reducing gas, e.g., hydrogen, at temperature lower than that for the thermal decomposition.

(1) Nickel Compound Particles

The nickel compound particles for the process of the present invention are not limited, and can be selected from various sources. However, nickel hydroxide particles having flat particles is preferable, especially when fine nickel powder having flat particles is to be produced. Therefore, nickel hydroxide particles having flat particles is selected, when fine nickel powder having flat particles is to be produced.

The process is not limited to nickel hydroxide. However, the product by the reaction between an aqueous nickel salt solution and an aqueous alkali solution is preferable. The nickel salt is not limited, but a water-soluble one, e.g., nickel nitrate or chloride, is preferable. The aqueous alkali solution is not limited, but aqueous ammonia solution is preferable.

The conditions for the reaction between an aqueous nickel salt solution and aqueous alkali solution are not limited. However, when a double jet method or the like is used for mixing the reactants, it is preferable to keep the reaction solution at a pH level lower than the isoelectric point of the nickel hydroxide particles, around pH 9.2. The pH value is preferably 8.7 or less, more preferably 8.4 or less to avoid the pH 9.2, the isoelectric point of nickel hydroxide. This prevents agglomeration of the nickel hydroxide particles during the reaction process, thereby giving well-dispersed fine nickel powder.

Use of a seed of nickel hydroxide particles is preferable, although not essential, to produce the particles of uniform size in a reaction system operated at a high concentration. The seed is synthesized in a highly diluted reaction system to have uniform size and the same shape as the target nickel hydroxide particles. For example, an aqueous nickel salt solution and aqueous alkali solution, each kept at an initial concentration of 0.1 mols/L or less, preferably 0.03 mols/L or less, are reacted with each other to synthesize homogeneous nickel hydroxide, which is used as the seed In the reaction system for producing nickel hydroxide particles in the presence of a seed, it is preferable to grow the particles by subsequently supplying an aqueous nickel salt solution and an aqueous alkali solution to the solution in which the seed is dispersed.

The nickel hydroxide suspension as the reaction product is preferably aging-treated at room temperature or under heating to have smooth particle surfaces, although this treatment is not essential.

(2) Step (A)

Step (A) forms nickel compound coated with gelatin by adsorbing gelatin on the nickel compound particles. The particles coated with gelatin are then separated by filtration, washed and dried.

The procedure for adsorbing gelatin on the nickel compound particles is not limited. It is, however, preferable to disperse the particles in an aqueous gelatin solution and chemically adsorb gelatin, which is a water-soluble high-molecular-weight substance.

Quantity of gelatin to be adsorbed is not limited. However, it is preferably adsorbed at 1.7% by mass or more relative to the total weight of the nickel compound and gelatin. Below 1.7% by mass, the fine nickel powder produced in Step (C) may have an insufficient reduction rate.

(3) Step (B)

Step (B) converts the nickel compound powders into fine particles containing metallic nickel and nickel oxide by heating the nickel compound coated with gelatin, produced in Step (A), in an inert gas atmosphere. This metallizes the nickel compound particles to produce the fine particles containing metallic nickel.

Heating temperature for Step (B) is not limited. It is however preferably 300 to 500° C., more preferably 350 to 450° C. The step operating at temperature in the above range produces metallic nickel without requiring a reducing gas. Below 300° C., the reduction rate may be too slow. Above 500° C., on the other hand, sintering of the particles with each other may significantly proceed.

The nickel compound powder is preferably nickel hydroxide particles having a plate-shape, when the fine nickel powder composed of plate-shape particles is to be produced. This can give a powder consisting of metallic nickel particles essentially retaining the plate-shape of starting nickel hydroxide.

Step (B) can produces the fine nickel powder at a metallization rate of 70% by mass or more.

(4) Step (C)

Step (C) reduces into fine particles of metallic nickel by treating the fine particles containing metallic nickel and nickel oxide, produced in Step (B), under heating at temperature lower than that for Step (B) in a reducing gas. This process is carried out at temperature much lower than that for a conventional hydrogen-aided reduction step for nickel compound particles having no gelatin adsorbed thereon and at a higher reduction rate, which prevents its sintering.

The heating temperature for Step (C) is not limited. It is, however, preferably 150 to 240° C., more preferably around 190° C. It is also lower than that for Step (B) to prevent sintering of the particles with each other. The temperature in the above range is selected to completely metallize nickel.

The nickel compound particles are preferably plate-shape nickel hydroxide particles when the fine nickel powder having a plate-shape is to be produced. This can give the metallic nickel particles essentially retaining the original nickel hydroxide particle shape.

The yield of the nickel converted by Step (C) is 90% by mass or more.

(5) Fine Nickel Powder

The process of the present invention can easily control the particle shape, when the nickel compound particles as a starting material is produced in a desired shape. When nickel hydroxide of plate-shape particles having a flat shape (especially hexagonal plate shape), diameter of limited variations and uniform thickness is used as a starting material, the process can produce the fine nickel powder composed of particles having a flat shape (or hexagonal plate shape), with diameter of limited variations and uniform thickness.

Using nickel hydroxide particles composed of plate-shape particles, fine nickel powder composed of plate-shape particles, each particle being of a mixture of metallic nickel and nickel oxide, having the largest projected diameter of 30 to 300 nm and thickness of 50 nm or less, can be produced by the process of the present invention in Step (B). Also, fine nickel powder composed of plate-shape particles of metallic nickel having the largest projected diameter of 30 to 300 nm and thickness of 50 nm or less can be produced in Step C.

The fine nickel powder is suitable for internal electrodes for laminate ceramic capacitors of high electric capacity, because it can exhibit sufficient characteristic and dimensional stability for these devices. In particular, the powder composed of plate-shape particles, having a submicron-order diameter and thickness of several tens nanometers, is a novel material, because it can be easily handled in a pasting step or the like, and give a laminate of increased number of layers stacked in the thickness direction.

EXAMPLES

The present invention is described in more detail by EXAMPLES and COMPARATIVE EXAMPLES, which by no means limit the present invention. The procedures for determination of reduction rate, particle observation and evaluation of particle size distribution used in EXAMPLES and COMPARATIVE EXAMPLES are described below.

(1) Determination of reduction rate: Reduction rate was determined by mass loss, using a Thermogravimetric analysis analyzer (Perkin Elmer)

(2) Observation of particles: Particle shape and size were determined from SEM microgram taken by the scanning electron microscope (JEOL, FE-SEM, JSM-7400F).

(3) Measurement of particle size distribution: Particle size distribution was measured by the analyzer (Brookhaven Instruments Corporation).

Example 1

Nickel compound powder with gelatin adsorbed on the particles was heat-treated in an inert gas atmosphere, to produce metal of nickel.

First, nickel hydroxide particles was synthesized by the following procedure. A suspension made by mixing 0.02 mol/L aqueous nickel nitrate solution and 0.04 mol/L aqueous $NH_4OH$ solution was aged for 5 hours in an oven kept at 95° C. Then, the solids were separated by filtration and dried at 110° C. for 12 hours or more under a vacuum, which produces the nickel hydroxide particles.

Gelatin was adsorbed on the particles by the following procedure.

A suspension with 1.8 g of nickel hydroxide dispersed in 25 mL of distilled water were mixed with 25 mL of 0.4% by mass aqueous gelatin solution, held for 30 minutes or more at room temperature, and then the solids were separated by filtration. The aqueous gelatin solution had a final gelatin concentration of 0.2% by mass. The nickel hydroxide particles with gelatin adsorbed on the particles, separated by filtration, was redispersed in 1 L of distilled water, filtered again, and dried at 110° C. for 12 hours or more, to produce the nickel hydroxide particles with a gelatin coating. Gelatin was adsorbed at 4.4% by mass.

Figure 1:
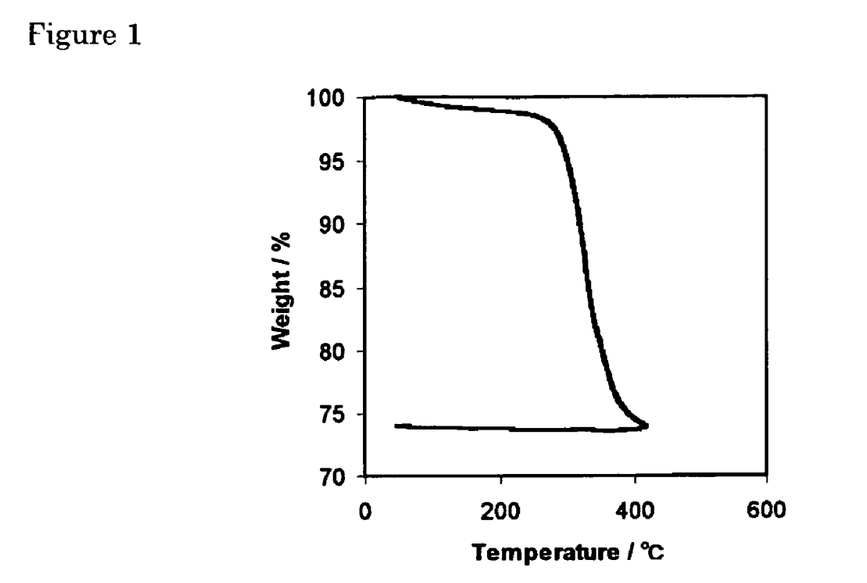
FIG. 1 shows thermogravimetric changes of the nickel hydroxide particles with gelatin adsorbed on the particles, produced in EXAMPLE 1.

For the TGA analysis the nickel hydroxide particles with gelatin adsorbed on the particles was heated up to 400° C. in nitrogen gas and then cooled, to obtain the mass loss curve. The results are given in FIG. 1, which shows the themogravimetric changes of the nickel hydroxide particles with gelatin adsorbed on the particles. The nickel composition, estimated from the mass loss shown in FIG. 1, gives the formula, $NiO_{0.66}$, indicating that nickel hydroxide is not only dehydrated perfectly but also reduced by the heat treatment in nitrogen gas atmosphere.

Figure 2:
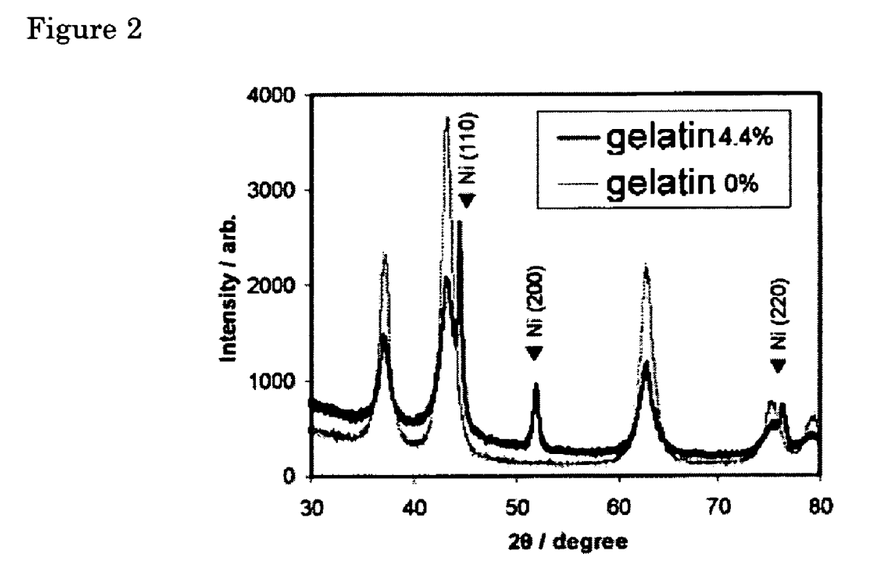
FIG. 2 shows an X-ray diffraction pattern of the fine powder, heat-treated in EXAMPLE 1.

The heat-treated fine powder was taken out of the TGA analyzer, and ground until it turned into a paste with a small quantity of paraffin oil for prevention of the oxidation of fine powder for powder X-ray diffraction analysis. The results are given in FIG. 2, which shows the X-ray diffraction pattern of the heat-treated powder, and also the pattern of the nickel hydroxide particles heated to 400° C. in nitrogen gas (marked with "gelatin: 0%"), for comparison. As shown in FIG. 2, the nickel hydroxide particles with gelatin adsorbed on the particles had a peak characteristic of metallic nickel in addition to those due to nickel oxide, NiO. It is found, therefore, that the heat-treated powder was a mixture of nickel oxide and metallic nickel, with 34% by mol of NiO converted to metallic nickel.

It is thus demonstrated that the process of the present invention, which treats nickel compound powder with gelatin adsorbed on the particles under heating in an inert gas atmosphere, can metallize nickel at low temperature.

Example 2 and Reference Example 1

The nickel compound powder with gelatin adsorbed on the particles was heat-treated in an inert gas atmosphere, to verify the effect of quantity of the adsorbed gelatin on metallization of nickel.

The nickel hydroxide particles with gelatin adsorbed on the particles was prepared in the same manner as in EXAMPLE 1, except that an aqueous gelatin solution of varying gelatin content was used in the coating process to have a varying gelatin adsorbed quantity of 1.6, 4.4 or 7.9% by mass on the particles. Furthermore, the maximum heat treatment temperature for the nickel hydroxide particles with gelatin adsorbed on the particles was varied in a range from 300 to 450° C. Each sample was analyzed to have a mass loss curve, based on the TGA results, to determine oxygen content (by mol per 1 mol of nickel) of the heat-treated fine powder. The results are given in FIG. 3, which shows the relationship between oxygen content (by mol per 1 mol of nickel) of the heat-treated fine powder and maximum heat treatment temperature for the nickel hydroxide particles on which gelatin was adsorbed at 1.6, 4.4 or 7.9% by mass (prepared in EXAMPLE 2). REFERENCE EXAMPLE was also carried out to metallize the nickel hydroxide particles in the same manner as in EXAMPLE 1) except that no gelatin was adsorbed to the nickel hydroxide particles, and treated the powder under heating (REFERENCE EXAMPLE 1). The results are also given in FIG. 3.

Figure 3:
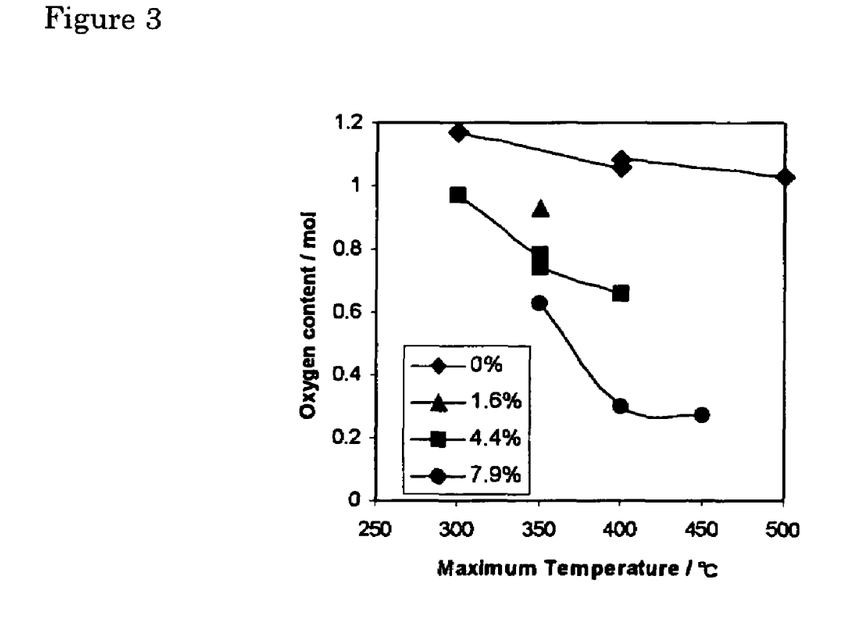
FIG. 3 shows the relationship between oxygen content of the heat-treated fine powder and maximum heat treatment temperature for the nickel hydroxide particles on which gelatin is adsorbed at a varying level in EXAMPLE 2.

As shown in FIG. 3, the nickel hydroxide particles with no gelatin adsorbed on the particles was not decomposed to NiO completely, even when the maximum heat treatment temperature was increased to 500° C., obviously indicating that no reduction of nickel oxide proceeded (REFERENCE EXAMPLE 1). On the other hand, the nickel hydroxide particles with gelatin adsorbed on the particles was metallized, increasingly as the maximum heat treatment temperature was increased, as indicated by decreased oxygen content, and this was more noted as adsorbed gelatin quantity increased (EXAMPLE 2). For example, when the nickel hydroxide particles with gelatin adsorbed on the particles at 7.9% by mass was heat treated at 450° C. as the maximum heat treatment temperature, the resulting nickel composition was $NiO_{0.27}$, indicating that heat treatment of the powder in a nitrogen gas atmosphere converted 73 mol % nickel oxide to nickel metal.

As discussed above, it is found that the process of the present invention can efficiently metallize nickel at low temperature by heat treatment of the nickel compound powder with gelatin adsorbed on the particles in an inert gas atmosphere.

Example 3

Figure 4:
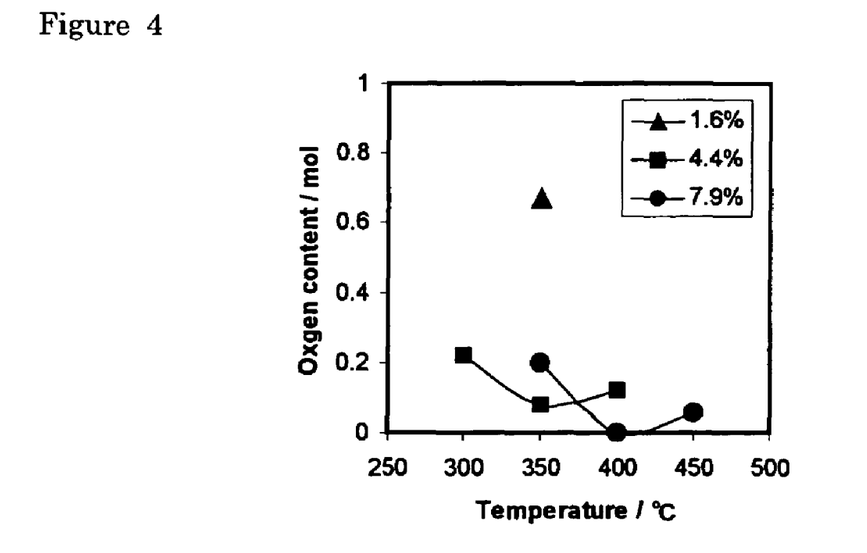
FIG. 4 shows the relationship between oxygen content of the fine powder produced by reduction with hydrogen and maximum heat treatment temperature in a nitrogen gas for the nickel hydroxide particles on which gelatin was adsorbed at a varying level in EXAMPLE 3.

The nickel hydroxide particles with gelatin adsorbed on the particles, prepared in EXAMPLE 2 (adsorbed gelatin quantity: 1.6, 4.4 or 7.9% by mass), was heated in nitrogen gas, and the resulting fine powder was reduced with hydrogen gas in a TGA analyzer (Perkin Elmer), to determine the oxygen content of the resulting fine nickel powder, where it was reduced with a hydrogen/nitrogen mixed gas containing 5 volume % hydrogen at 190° C. for 150 minutes. FIG. 4 shows the relationship between oxygen content (by mol per 1 mol of nickel) of the fine powder produced by reduction with the hydrogen/nitrogen mixed gas and maximum heat treatment temperature in a nitrogen gas for the nickel hydroxide particles on which gelatin was adsorbed at 1.6, 4.4 or 7.9% by mass.

As seen in FIG. 4, the reduction rate tends to increase as quantity of the adsorbed gelatin increases, and reduction is essentially completed for samples containing 4.4% by mass or more of gelatin. There appears to be an optimum treatment temperature associated with the adsorbed gelatin quantity level. This temperature is around 350° C. at an adsorbed gelatin quantity of 4.4% by mass, and around 400° C. at 7.9% by mass. At 1.6% by mass, the reduction proceeds but at a reduction rate slightly higher than 30%, conceivably due to insufficient gelatin quantity.

It is thus demonstrated that the process of the present invention, which treats nickel compound powder with gelatin adsorbed on the particles under heating in an inert gas atmosphere, and then treats the powder under heating in a reducing gas atmosphere, can metallize nickel very efficiently at low temperature.

Example 4

Figure 5:
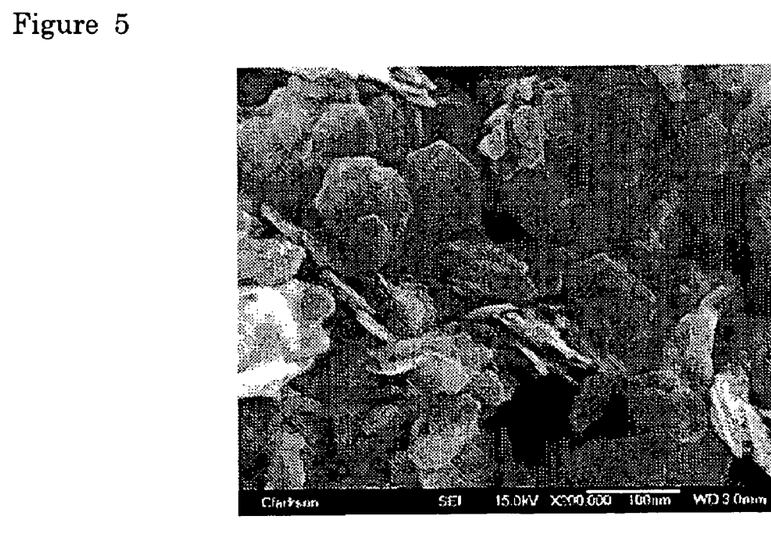
FIG. 5 is an FE-SEM image of the fine nickel powder, produced in EXAMPLE 4.
Figure 6:
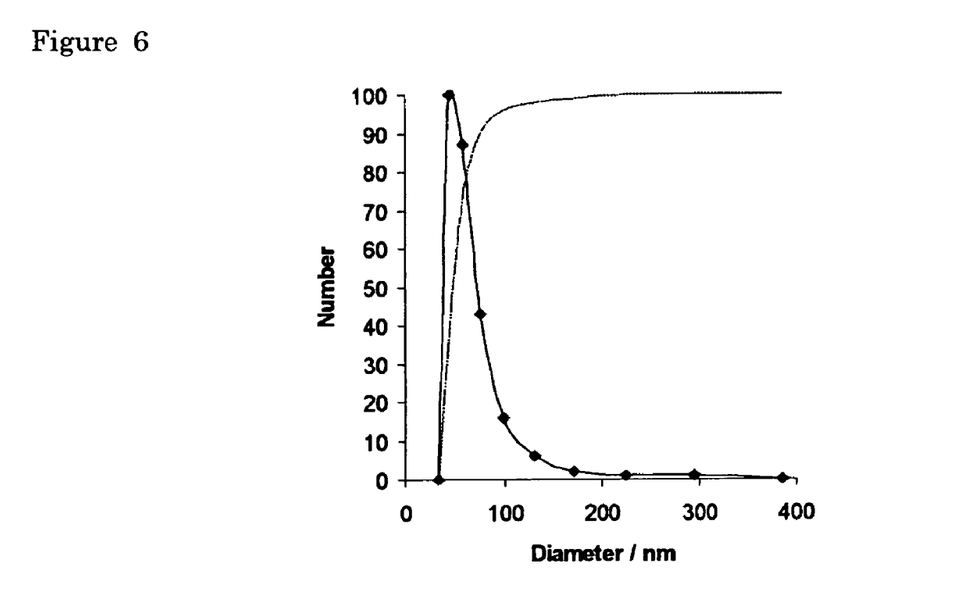
FIG. 6 presents a particle size distribution of the fine nickel powder, produced in EXAMPLE 4.

The nickel hydroxide particles with 4.4% by mass gelatin adsorbed on the particles was prepared in the same manner as in EXAMPLE 1 with respect to the production and gelatin adsorbing treatment conditions, and heat-treatment conditions. The resulting fine nickel powder was observed by FE-SEM images. The particle size distribution was measured.

The fine powder contained 92 at. % metallic nickel.

FIG. 5 displays the FE-SEM image of the fine nickel powder. As shown, the hexagonal shape was kept with very sharp edges, essentially free of sintered with each other.

FIG. 6 presents the particle size distribution based on which it is estimated that the particles have an average diameter of 63 nm, with those having a diameter of 131 nm or less accounting for 98% of the total. These results are in good agreement with the primary particle diameter, observed by FE-SEM analysis.

It is thus demonstrated that the process of the present invention, which treats nickel hydroxide particles with gelatin adsorbed on the particles under heating in an inert gas atmosphere and then treating the powder under heating in hydrogen atmosphere, can reduce the nickel compound to metallic nickel at drastically lowered temperature without causing sintering.

[Heating Treatment Conditions]

(a) Keeping the sample at 50° C. for 3 minutes in a nitrogen gas flowing at 45 mL/minute (b) Heating the sample at 5° C./minute from 50 to 350° C.

(c) Cooling the sample at 5° C./minute from 350 to 150° C.

(d) Heating the sample at 0.5° C./minute from 150 to 180° C. in a hydrogen/nitrogen mixed gas (hydrogen concentration: 5% by volume) flowing at 45 mL/minute (e) Keeping the sample at 180° C. for 150 minutes (f) Cooling the sample at 20° C./minute from 180 to 100° C.

(g) Cooling the sample at 10° C./minute from 100 to 30° C.

(h) Keeping the sample at 30° C. for 15 minutes in a nitrogen gas flowing at 45 mL/minute (i) Keeping the sample at 30° C. for 5 minutes in air flowing at 20 mL/minute Example 5

Figure 7:
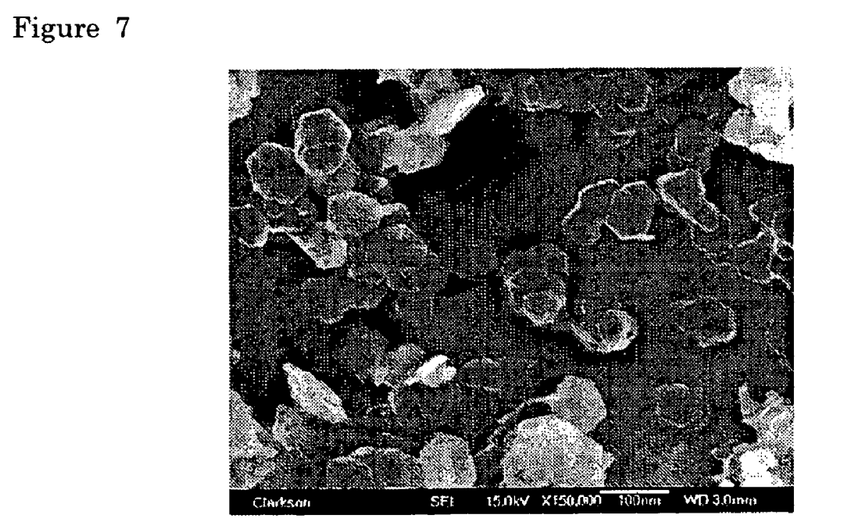
FIG. 7 is an FE-SEM image of the fine nickel powder, produced in EXAMPLE 5.

The fine nickel powder was produced in the same manner as in EXAMPLE 4, except that it was kept at 180° C. for 1 minute. It was observed by FE-SEM images. The FE-SEM image of the resulting particles is given in FIG. 7. As shown, the particles retain their hexagonal plate shape as the original shape of the starting nickel hydroxide particles.

Example 6

The fine nickel powder was produced in the same manner as in EXAMPLE 4, except that the nickel hydroxide particles was kept at room temperature for 2 days. The fine nickel particles retained their hexagonal plate shape, as confirmed by FE-SEM images.

Example 7

The fine nickel powder was produced in the same manner as in EXAMPLE 4, except that the nickel hydroxide particles was produced from an aqueous solution containing nickel chloride and $NH_4OH$ at 0.02 and 0.04 mols/L, respectively, and kept at room temperature for 2 days. The fine nickel particles retained their hexagonal plate shape, as confirmed by FE-SEM images.

Example 8

The fine nickel powder was produced in the same manner as in EXAMPLE 4, except that the nickel hydroxide particles was produced under the following conditions. The fine nickel particles retained their hexagonal plate shape, as confirmed by FE-SEM images.

[Conditions for Producing Nickel Hydroxide Particles]

A suspension of 0.03 mol/L aqueous nickel nitrate solution and 0.06 mols/L aqueous $NH_4OH$ solution was aged for 5 hours in an oven kept at 95° C., to produce the nickel hydroxide particles, which was used as a seed. These solids were dispersed in pure water to prepare 200 mL of the suspension containing nickel at 0.15 mol/L. To this suspension were added 1 mol/L aqueous nickel nitrate solution and 1.8 mol/L aqueous $NH_4OH$ solution, each at 1 mL/minute for 190 minutes. Flow rates of these solutions were finely adjusted to keep the suspension at a pH of 8.5 during the reaction process.

Comparative Example 1

Dried nickel hydroxide particles was produced in the same manner as in EXAMPLE 1. It was reduced with hydrogen gas in a TGA analyzer (Perkin Elmer), to determine the degree of reduction from the mass loss. The particles were observed by FE-SEM. The actual reduction was carried out with a hydrogen/nitrogen mixed gas containing 5% by volume of hydrogen in 2-stage heating schedules, where the powder was heated at 5° C./minute to 275° C., at which it was kept for 4 minutes, and then at 2° C./minute to 350° C., at which it was kept for 60 minutes. The powder was then cooled to 30° C.

The fine powder contained 79 at. % of metallic nickel.

Figure 8:
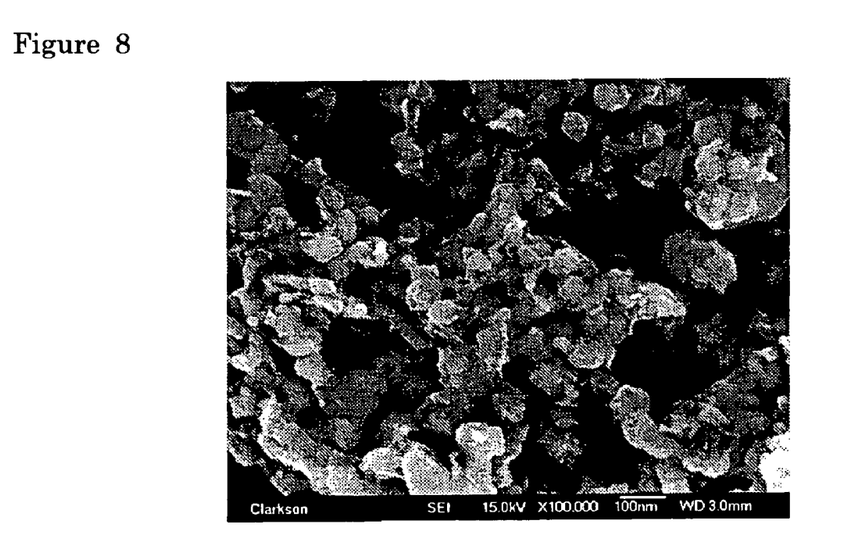
FIG. 8 is an FE-SEM image of the fine nickel powder, produced in COMPARATIVE EXAMPLE 1.

FIG. 8 displays the FE-SEM image of this powder. The particles were greatly deformed by the reduction, and no longer retained a hexagonal plate shape. Furthermore, a considerable amount of sintering of the particles was observed.

Comparative Example 2

Dried nickel hydroxide particles was produced in the same manner as in EXAMPLE 1. It was heated in a TGA analyzer (Perkin Elmer) in two stages to decrease temperature at which reduction started, where nickel hydroxide was reduced to $NiO.nH_2O$ in a nitrogen gas in the first stage to further reduce it in the second stage in a hydrogen/nitrogen mixed gas (hydrogen concentration: 5% by volume). Decreasing the maximum heat treatment temperature in the first stage allowed to decrease temperature at which reduction started. Therefore, the maximum heat treatment temperature in the first stage was set at 290° C. The reduction could be started at around 220° C. in the second stage, but was not completed when temperature was kept at 260° C. for 20 hours.

The fine nickel powder had a reduction rate of 70%.

Figure 9:
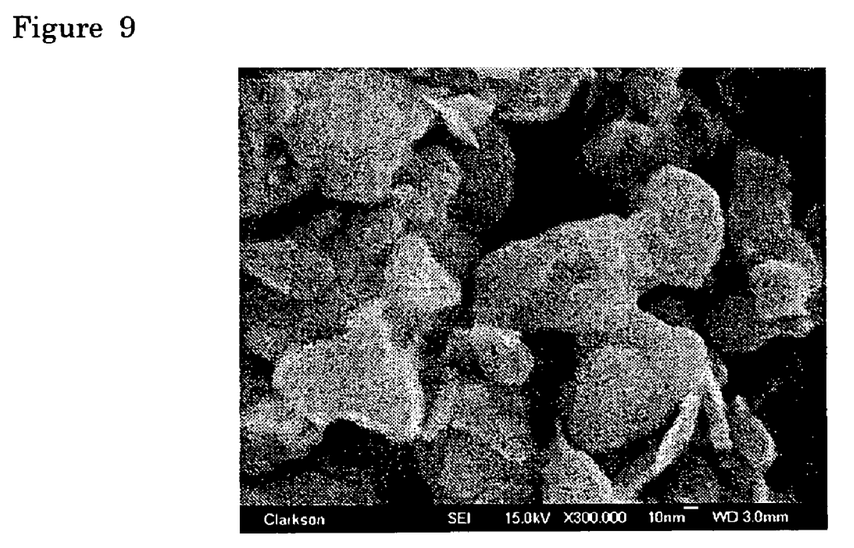
FIG. 9 is an FE-SEM image of the fine nickel powder, produced in COMPARATIVE EXAMPLE 2.

FIG. 9 displays the FE-SEM image of the fine nickel powder. As shown, sintering of the particles is clearly observed.

As discussed, it is found that decreasing temperature for the heat treatment in a nitrogen gas can decrease temperature at which reduction starts, but cannot prevent sintering of the particles with each other during the reduction process.

As clearly demonstrated, the process of the present invention for producing fine nickel powder is an efficient process for metallization at low temperature, because of its capability of preventing sintering. Moreover, it can easily control particle shape, when nickel compound powder as a starting material is prepared to have particles of desired shape, and hence is useful. The fine nickel powder produced by the process is composed of particles having a flat shape (especially hexagonal plate shape), diameter of limited variations and uniform thickness, and is suitable for internal electrodes for laminate ceramic capacitors of high electric capacity.

What is claimed is:

1. A process for producing fine nickel powder, comprising
    Step (A): dispersing in aqueous gelatin solution, filtrating, washing and chemically adsorbing gelatin on preformed nickel hydroxide particles with different size and shape forming a nickel hydroxide adsorbed with gelatin, and
    Step (B): heating the nickel hydroxide adsorbed with gelatin produced in Step (A) in an inert gas atmosphere converting said nickel hydroxide adsorbed with gelatin into fine particles containing metallic nickel and nickel oxide.

2. The process according to claim 1 for producing fine nickel powder, wherein Step (B) is followed by an additional Step (C) heating at temperature lower than that for Step (B) in a reducing gas atmosphere completely reducing nickel oxide in said fine particles.

3. The process according to claim 1 for producing fine nickel powder, wherein a shape of said preformed nickel hydroxide particles is preserved after converting in Step (B).

4. The process according to claim 1 for producing fine nickel powder, wherein said nickel hydroxide particles is produced by the reaction by mixing an aqueous nickel salt solution with an aqueous alkali solution.

5. The process according to claim 4 for producing fine nickel powder, wherein an agitated aqueous suspension of said nickel hydroxide particles is aged at room temperature.

6. The process according to claim 4 for producing fine nickel powder, wherein an agitated aqueous suspension of said nickel hydroxide particles is aged under heating.

7. The process according to claim 4 for producing fine nickel powder, wherein said reaction is carried out at pH of the reactant solution kept lower than the isoelectric point of the nickel hydroxide.

8. The process according to claim 4 for producing fine nickel powder, wherein said reaction is carried out in the presence of preformed seeds of nickel hydroxide particles.

9. The process according to claim 8 for producing fine nickel powder, wherein said seeds are prepared by mixing nickel salt aqueous solution at a concentration of 0.1 mol/L or less with aqueous alkali solution to synthesize finely dispersed and uniform nickel hydroxide.

10. The process according to claim 1 for producing fine nickel powder, wherein said preformed nickel hydroxide particles are plate-shaped particles.

11. The process according to claim 1 for producing fine nickel powder, wherein a quantity of gelatin of said nickel hydroxide adsorbed with gelatin is at 1.7% by mass or more relative to the total weight of the nickel hydroxide and gelatin.

12. The process according to claim 1 for producing fine nickel powder, wherein Step (A) is carried out by dispersing said preformed nickel hydroxide particles in an aqueous solution of gelatin.

13. The process according to claim 1 for producing fine nickel powder, wherein Step (B) is carried out by heating at temperatures between 300 and 500° C.

14. The process according to claim 2 for producing fine nickel powder, wherein Step (C) is carried by heating at temperatures between 150 and 240° C.

15. The process according to claim 2 for producing fine nickel powder, wherein a shape of said preformed nickel hydroxide particles is preserved after converting in Step (B) or reducing in Step (C).

* * * * *